United States Patent [19]

Schoenfelder et al.

[11] Patent Number: 4,618,777

[45] Date of Patent: Oct. 21, 1986

[54] OUTER ELECTRODE WITH IMPROVED SMOKE ENTRY

[75] Inventors: George A. Schoenfelder, Downers Grove; Stephen L. Siegel, Hanover Park; James S. Slater, Batavia, all of Ill.

[73] Assignee: Pittway Corporation, Aurora, Ill.

[21] Appl. No.: 673,110

[22] Filed: Nov. 19, 1984

[51] Int. Cl.[4] .......... G01T 1/185

[52] U.S. Cl. .......... 250/381; 250/384

[58] Field of Search .......... 250/381, 382, 384, 385, 250/574; 340/628, 629

[56] References Cited

U.S. PATENT DOCUMENTS 3,621,337 11/1971 Kappenhagen .
3,916,209 10/1975 Steele et al. .......... 250/574
4,090,178 5/1978 Norris .
4,168,438 9/1979 Morisue .......... 250/574
4,216,377 8/1980 Hasegawa et al. .......... 250/574
4,236,822 12/1980 Jaretsky et al. .
4,249,082 2/1981 Kakigi et al. .......... 250/574
4,257,039 3/1981 Webb et al. .......... 250/381
4,258,261 3/1981 Conforti .......... 250/381
4,269,510 5/1981 Horvath et al. .......... 250/574
4,374,329 2/1983 Schoenfelder et al. .......... 250/574
4,469,953 9/1984 Fujisawa et al. .......... 250/574

*Primary Examiner*—Carolyn E. Fields
*Attorney, Agent, or Firm*—Emrich & Dithmar

[57] ABSTRACT

An outer electrode for a combustion products detector comprising a cylindrical body including a plurality of first slats alternating with a plurality of second slats, the first slats being segments of a first surface of revolution, the second slats being skewed from a second surface of revolution having a different diameter from the first surface of revolution.

1 Claim, 4 Drawing Figures

OUTER ELECTRODE WITH IMPROVED SMOKE ENTRY

BACKGROUND OF THE INVENTION

The present invention relates to combustion products detectors and, in particular, to an outer electrode with improved smoke entry.

Devices for detecting combustion products, such as smoke, are principally of two types, ionization type detectors and photoelectric detectors. In an ionization type detector, a conductive housing forms the outer electrode, as disclosed in U.S. Pat. No. 4,258,261 issued on Mar. 24, 1981.

The outer electrode must allow the entry of combustion products such as smoke into the interior of the electrode for detection. The larger the slots the more readily smoke can enter the electrode. However, with the increased size of the slots, high air velocity and static electricity can also enter the electrode more readily.

High air velocity and static electricity can adversely affect the smoke detection capabilities of the unit. In ionization type detectors, a minute electrical current is developed between two collector plates which is diminished when the smoke particles are in the ionized space and impede passage of the ions. However, when high velocity air passes into the electrode and carries out the ions, a spurious fire signal can be given by the detector as it simulates the reduced current flow caused by entrance of particles of combustion. Static electricity can likewise cause spurious fire signals to occur.

Therefore, a compromise must be reached to allow maximum smoke entry while minimizing the undesirable outside influences of high air velocity and static electricity.

SUMMARY OF THE INVENTION

It is an important object of the present invention to provide an outer electrode with improved smoke entry.

Another important object of this invention is to provide an outer electrode which permits maximum smoke entry while minimizing undesirable outside influences such as high air velocity and static electricity.

These and other objects of the invention are attained by providing an outer electrode for a combustion products detector comprising a cylindrical body including a plurality of first slats alternating with a plurality of second slats, the first slats being segments of a first surface of revolution having a first diameter, the second slats being skewed from a second surface of revolution having a second diameter different from the first diameter.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating and understanding of the invention, there is illustrated in the accompanying drawings a preferred embodiment thereof from an inspection of which when considered in connection with the following description the invention, its construction and operation and many of its advantages shown to be readily understood and appreciated.

DESCRIPTION OF THE PREFERRED EMBODIMENT

Figure 1:
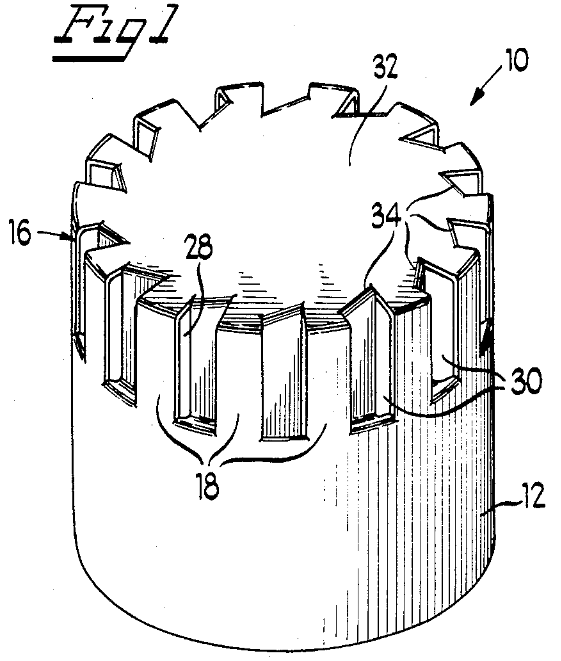
FIG. 1 is a perspective view of an outer electrode incorporating the features of the present invention.
Figure 4:
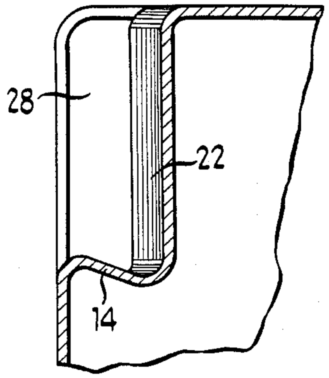
FIG. 4 is a fragmentary cross-sectional view taken along the line 4—4 of FIG. 2.
Figure 3:
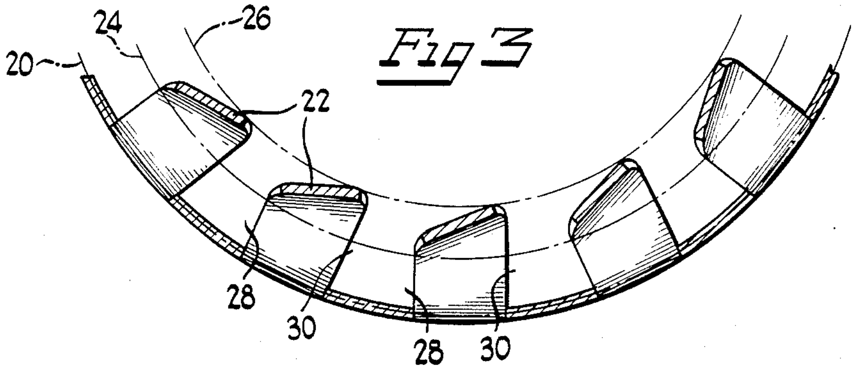
FIG. 3 is a fragmentary cross-sectional view taken along the line 3—3 of FIG. 2.
Figure 2:
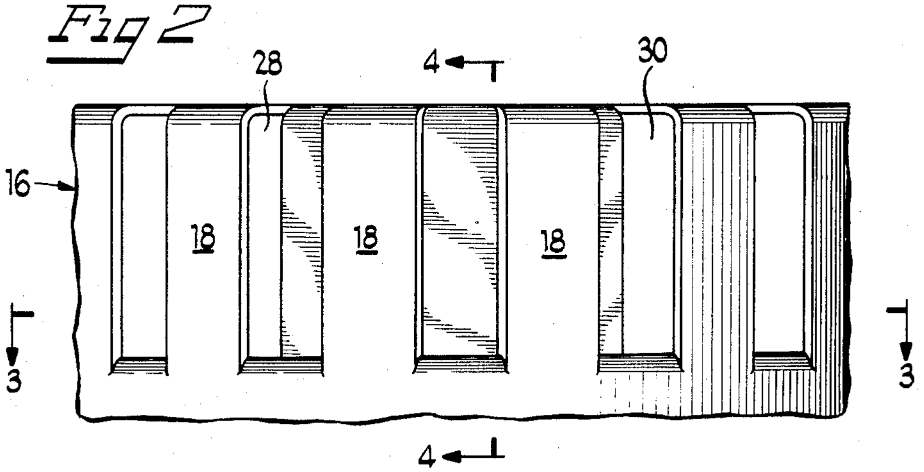
FIG. 2 is a fragmentary elevational side view on an enlarged scale of the outer electrode of the present invention.

Referring now to the drawings, there is illustrated an outer electrode 10 for use in an ionization detection system of the type disclosed in U.S. Pat. No. 4,258,261 issued on Mar. 24, 1981. Detectors of this type include a conductive housing forming the outer electrode 10. A minute electrical charge is developed between the outer electrode 10 and a small second electrode (not shown) disposed within the outer electrode 10, which charge is diminished when the smoke particles are in the ionized space and impede passage of the ions. Further details of these detectors may be had by referring to U.S. Pat. Nos. 4,044,763 and 4,258,261.

The outer electrode 10 includes a base portion 12, a vent portion 16 and a top wall 32. The base portion 12 is cylindrical with a height greater than the vent portion 16.

The vent portion 16 includes a plurality of outer slats 18 alternating with a plurality of inner slats 22 forming a plurality of entry slots 28 and 30 which allow the introduction of ambiant air and products of combustion into the interior of the electrode 10. The outer slats 18 are segments of a first surface of revolution 20. The base portion 12 has the same diameter as the first surface of revolution 20. The inner slats 22 are skewed between a second surface of revolution 24 and a third surface of revolution 26. The slots 28 are narrower than the slots 30. The slots 28 lie between the first surface of revolution 20 and the second surface of revolution 24. The slots 30 lie between the first surface of revolution 20 and the third surface of revolution 26.

The top wall 32 has a plurality of notches 34. The inner slats 22 merge with the top wall 32 at the inner edge of the notches 34. All of the outer slats 18 have the same angular extent. All of the inner slats 22 have the same width.

Connecting the base portion 12 and each inner slat 22 are inner walls 14. The inner walls 14 slope away from the top wall 32 as they extend radially inward.

The diameter of the second surface of revolution 24 and the diameter of the third surface of revolution 26 are such that the slots 28 and 30 allow a maximum effective smoke entry while the effects of high velocity air streams and static are minimized. The skewing of the slats 22 increases the width of the slot 30 for improved smoke entry. This improved smoke entry is achieved while still minimizing the effects of high air velocity streams and static by preventing any direct access into the interior of the outside electrode 10.

In the present embodiment, the inner slats 22 are skewed at an angle of about 28° to a plane tangent to the second surface of revolution 24 at the intersection with an inner slat 22.

The electrode 10 of the present invention is formed from a single sheet of metal. The inner slats 22 may be struck from a continuous metal cylinder with the diameter of the first surface of revolution 20.

From the foregoing, it can be seen that there has been provided an outer electrode for combustion products detectors having improved smoke entry. The electrode allowing maximum smoke entry while minimizing the undesirable outside influences of high air velocity and static electricity.

We claim:

1. An outer electrode for a combustion products detector comprising a cylindrical base portion; a cylindrical vent portion integral with said base portion; and a top wall integral with said vent portion; said vent portion including a plurality of alternating inner and outer slats forming entry slots allowing the introduction of ambient air and products of combustion, said outer slats being segments of a first surface of revolution having a first diameter, said inner slats being skewed between second and third surfaces of revolution having a second and third diameters, respectively, and a plurality of inner walls joining said inner slats to said base and sloping radially inwardly and away from said top wall.

* * * * *